US012811235B2

(12) United States Patent
Futazuka

(10) Patent No.: US 12,811,235 B2
(45) Date of Patent: Nov. 24, 2026

(54) IN-VEHICLE BATTERY FRAME STRUCTURE

(71) Applicant: AISIN KEIKINZOKU CO., LTD., Imizu (JP)

(72) Inventor: Shigeru Futazuka, Imizu (JP)

(73) Assignee: AISIN KEIKINZOKU CO., LTD. (JP)

( * ) Notice: Subject to any disclaimer, the term of this patent is extended or adjusted under 35 U.S.C. 154(b) by 295 days.

(21) Appl. No.: 18/637,647

(22) Filed: Apr. 17, 2024

(65) Prior Publication Data

US 2024/0266663 A1 Aug. 8, 2024

Related U.S. Application Data

(63) Continuation of application No. PCT/JP2022/027698, filed on Jul. 14, 2022.

(30) Foreign Application Priority Data

Oct. 26, 2021 (JP) ................................ 2021-174928

(51) Int. Cl.
*H01M 50/262* (2021.01)
*H01M 50/249* (2021.01)

(52) U.S. Cl.
CPC ....... *H01M 50/262* (2021.01); *H01M 50/249* (2021.01); *H01M 2220/20* (2013.01)

(58) Field of Classification Search
CPC ............. H01M 50/262; H01M 50/249; H01M 2220/20
See application file for complete search history.

(56) References Cited

U.S. PATENT DOCUMENTS 5,501,289 A * 3/1996 Nishikawa ............... B60K 1/04 280/783
5,558,949 A * 9/1996 Iwatsuki ............. H01M 10/617 180/68.5
5,585,204 A * 12/1996 Oshida ................ H01M 50/209 429/62
7,128,999 B1 * 10/2006 Martin ................ H01M 50/249 429/186

(Continued)

FOREIGN PATENT DOCUMENTS

JP 6798310 B2 7/2018
JP 2019-133861 A 8/2019

(Continued)

OTHER PUBLICATIONS

International Search Report issued in the corresponding International Application No. PCT/JP2022/027698; mailed on Oct. 4, 2022 (total 4 pages).

*Primary Examiner* — Jacob B Meyer
(74) *Attorney, Agent, or Firm* — Harness, Dickey & Pierce, P.L.C.

(57) ABSTRACT

An in-vehicle battery frame structure for mounting a battery module having battery cells to a vehicle, the in-vehicle battery frame structure comprising: a battery case; cross frames removably fastened between side walls included in the battery case; and a pair of end plates that is held parallel to the side walls to a pair of opposing cross frames among the cross frames and sandwiches the battery cells between the pair of end plates.

11 Claims, 10 Drawing Sheets

(56) References Cited

U.S. PATENT DOCUMENTS

| | | | | |
|---|---|---|---|---|
| 7,507,499 | B2 * | 3/2009 | Zhou | H01M 50/289 |
| | | | | 429/96 |
| 7,771,865 | B2 * | 8/2010 | Takasaki | H01M 10/625 |
| | | | | 429/82 |
| 7,824,797 | B2 * | 11/2010 | Nishino | H01M 50/26 |
| | | | | 429/154 |
| 7,926,602 | B2 * | 4/2011 | Takasaki | H01M 50/209 |
| | | | | 180/68.5 |
| 7,931,105 | B2 * | 4/2011 | Sato | B60L 50/64 |
| | | | | 180/2.2 |
| 7,997,368 | B2 * | 8/2011 | Takasaki | B60L 50/64 |
| | | | | 180/68.5 |
| 8,012,620 | B2 * | 9/2011 | Takasaki | B60L 50/66 |
| | | | | 429/61 |
| 8,079,435 | B2 * | 12/2011 | Takasaki | H01M 50/202 |
| | | | | 180/68.5 |
| 8,210,301 | B2 * | 7/2012 | Hashimoto | B60K 1/04 |
| | | | | 180/68.5 |
| 8,276,697 | B2 * | 10/2012 | Takasaki | B60L 3/0007 |
| | | | | 903/952 |
| 8,728,648 | B2 * | 5/2014 | Choo | H01M 50/209 |
| | | | | 429/96 |
| 8,936,125 | B2 * | 1/2015 | Nakamori | H01M 50/249 |
| | | | | 220/651 |
| 8,980,458 | B2 * | 3/2015 | Honjo | H01M 50/229 |
| | | | | 429/96 |
| 9,159,970 | B2 * | 10/2015 | Watanabe | H01M 10/613 |
| 10,017,037 | B2 * | 7/2018 | Newman | H01M 50/271 |
| 10,099,546 | B2 * | 10/2018 | Hara | B60K 1/04 |
| 10,207,574 | B2 * | 2/2019 | Ozawa | H01M 50/204 |
| 10,483,510 | B2 * | 11/2019 | Stephens | H01M 50/249 |
| 10,547,039 | B2 * | 1/2020 | Toyota | B60K 1/04 |
| 10,632,857 | B2 * | 4/2020 | Matecki | B60L 50/64 |
| 10,886,513 | B2 * | 1/2021 | Stephens | H01M 50/224 |
| 10,894,470 | B2 * | 1/2021 | Matsuo | B60K 1/04 |
| 10,916,749 | B2 * | 2/2021 | Kawaguchi | B60L 50/66 |
| 11,021,070 | B2 * | 6/2021 | Miyoshi | H01M 50/249 |
| 11,088,412 | B2 * | 8/2021 | Matecki | H01M 50/204 |
| 11,155,150 | B2 * | 10/2021 | Stephens | B60K 11/02 |
| 11,211,656 | B2 * | 12/2021 | Matecki | H01M 50/271 |
| 11,214,137 | B2 * | 1/2022 | Stephens | B60L 50/66 |
| 11,688,910 | B2 * | 6/2023 | Stephens | B60L 50/64 |
| | | | | 429/96 |
| 12,330,515 | B2 * | 6/2025 | Bluemel | H01M 50/249 |
| 12,347,879 | B2 * | 7/2025 | Matecki | H01M 50/249 |
| 2009/0236162 | A1 * | 9/2009 | Takasaki | H01M 50/227 |
| | | | | 180/68.5 |
| 2011/0143179 | A1 * | 6/2011 | Nakamori | H01M 50/271 |
| | | | | 429/99 |
| 2012/0301765 | A1 * | 11/2012 | Loo | H01M 50/229 |
| | | | | 429/100 |
| 2013/0192914 | A1 * | 8/2013 | Nakamori | B60L 50/64 |
| | | | | 180/68.5 |
| 2013/0229030 | A1 * | 9/2013 | Yamaguchi | B62D 25/20 |
| | | | | 296/193.07 |
| 2016/0359153 | A1 * | 12/2016 | Kano | H01M 50/20 |
| 2018/0050607 | A1 * | 2/2018 | Matecki | B60L 50/64 |
| 2018/0062224 | A1 * | 3/2018 | Drabon | H01M 10/625 |
| 2018/0337377 | A1 * | 11/2018 | Stephens | H01M 50/224 |
| 2018/0337378 | A1 * | 11/2018 | Stephens | B60L 50/66 |
| 2020/0127254 | A1 * | 4/2020 | Yamanaka | H01M 50/209 |
| 2021/0036280 | A1 * | 2/2021 | Nishimori | H01M 50/264 |
| 2024/0266663 | A1 * | 8/2024 | Futazuka | H01M 50/209 |
| 2024/0322339 | A1 * | 9/2024 | Ishizaki | H01M 10/425 |

FOREIGN PATENT DOCUMENTS

| | | | | | |
|---|---|---|---|---|---|
| JP | 2020-064815 | A | | 4/2020 | |
| JP | 2022170756 | A | * | 11/2022 | |
| JP | 7753555 | B2 | * | 10/2025 | H01M 50/271 |
| WO | WO-2022230344 | A1 | * | 11/2022 | H01M 50/249 |
| WO | WO-2022230345 | A1 | * | 11/2022 | H01M 50/249 |
| WO | WO-2022230346 | A1 | * | 11/2022 | H01M 50/242 |
| WO | WO-2024095716 | A1 | * | 5/2024 | B60K 1/04 |

* cited by examiner

IN-VEHICLE BATTERY FRAME STRUCTURE

CROSS REFERENCE TO RELATED APPLICATIONS

This application is a continuation of International Patent Application No. PCT/JP2022/027698, having an international filing date of Jul. 14, 2022, which designated the United States, the entirety of which is incorporated herein by reference. Japanese Patent Application No. 2021-174928 filed on Oct. 26, 2021 is also incorporated herein by reference in its entirety.

BACKGROUND OF THE INVENTION

The present disclosure relates to a battery frame structure for mounting a battery module as a drive source to a vehicle.

In electric vehicles, hybrid vehicles, and the like, battery modules each including battery cells serving as a drive source are mounted on the rear side, the front side, or under the floor of the vehicles, for example.

In addition to the object to protect the battery module from an external impact, the structure for mounting the battery module to the vehicle is required to have excellent reusability of resources, especially in recent years when the vehicle is scrapped.

In the structure disclosed in JP-A-2020-64815, stacked battery cells is restrained by a restraining member (first member), and this restraining member is fixed to a protective member (beam member) fixed to a battery case and thereby to ensure high rigidity as the battery module and cause an external load to be antecedently input into the protective member.

Such a structure requires the restraining member and the protective member, that increases the number of components, and the protective member is attached to the battery case; therefore, it cannot be said that the reusability of resources is high.

The structure in JP-B-6798310 uses brackets to suppress relative movement between battery modules, and the brackets protect the battery modules from an external input.

However, the brackets do not have a function of restraining stacked battery cells, and a restraining member is required to restrain the battery cells; therefore, the number of members becomes larger.

DETAILED DESCRIPTION

Figure 1:
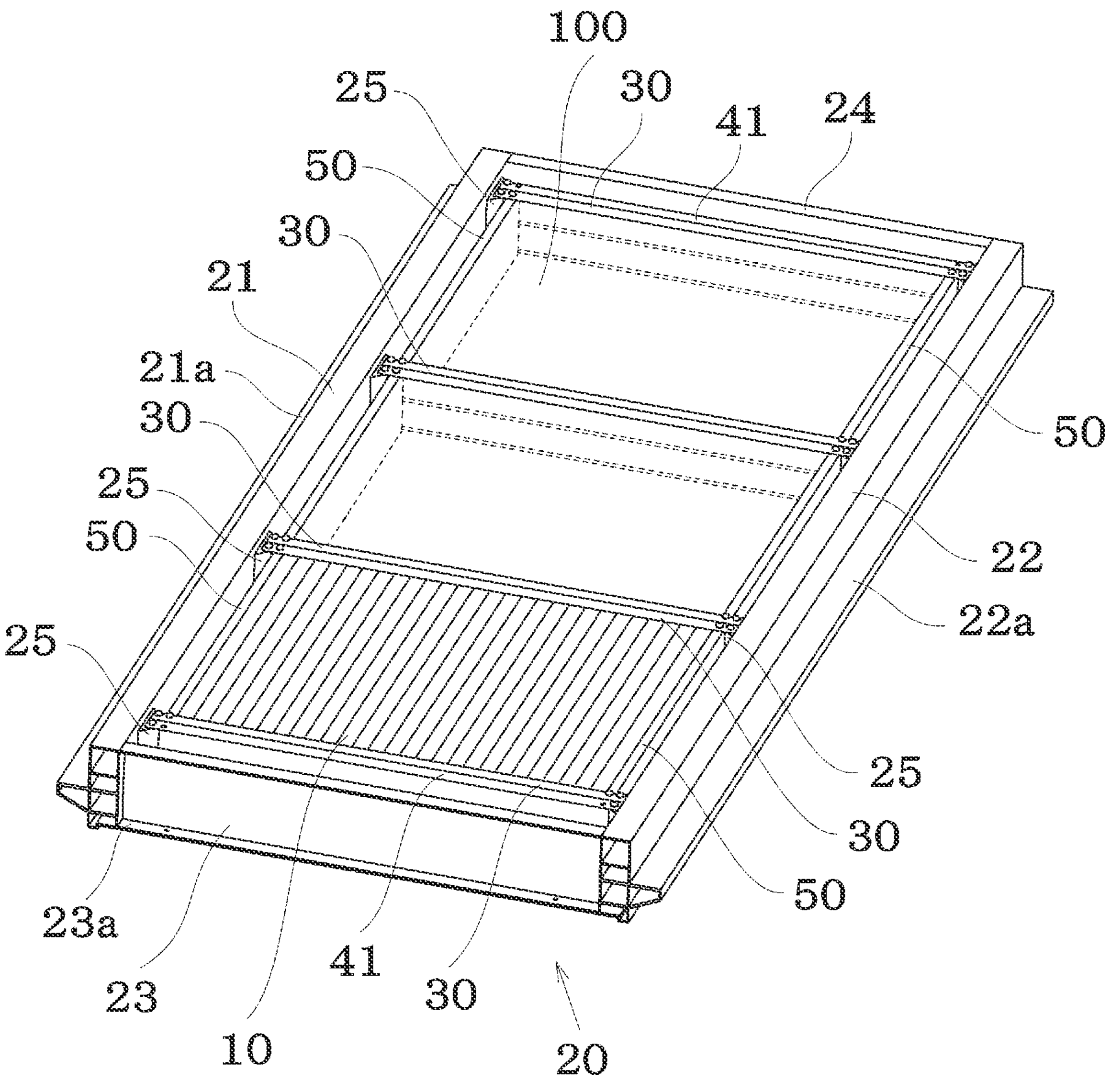
FIG. 1 illustrates an example of an in-vehicle battery frame structure according to the disclosure.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being “connected” or “coupled” to a second element, such description includes embodiments in which the first and second elements are directly connected or coupled to each other, and also includes embodiments in which the first and second elements are indirectly connected or coupled to each other with one or more other intervening elements in between.

The disclosure has an object to provide an in-vehicle battery frame structure that can reduce the number of components more than those of the related art and is excellent in reusability of resources at the time of collecting batteries, or the like.

The in-vehicle battery frame structure according to the disclosure is an in-vehicle battery frame structure for mounting a battery module having battery cells to a vehicle, the in-vehicle battery frame structure including:

a battery case having side walls;

- cross frames removably fastened between the side walls; and
- a pair of end plates that is held parallel to the side walls to a pair of opposing cross frames among the cross frames and sandwiches the battery cells between the pair of end plates.

The battery case referred to here is a case used for accommodating battery modules each including: battery cells repeatedly rechargeable; and control equipment thereof, or the like, and the battery case is mounted under the floor of a vehicle, for example.

The battery case can be manufactured, for example, by closing at least one aperture of a frame formed by a front wall, a rear wall, and side walls (left wall, right wall) with a panel body; however, the disclosure is not limited to this.

In addition, in the present specification, for convenience of explanation, a direction easily subjected to an external impact is expressed as a left-right direction; however, there is no limitation on the mounting direction to the vehicle.

In the disclosure, the cross frames removably fastened to the inner side of the battery case not only protects the battery modules each including battery cells from an external impact but also holds the end plates to the cross frames to restrain the battery cells between the pair of end plates.

Accordingly, it is unnecessary to restrain the battery cells by using restraining members as with the related art, and it becomes easier to collect the cross frames or the like when the batteries are collected, that contributes to recycling.

In the disclosure, each cross frame may include a fastening flange that fastens each end plate by bolting.

For example, by inserting the end plate uprightly into the lower part of the fastening flange of the cross frame and fastening the fastening flange and the end part of the end plate by bolting, the battery cells can be more easily collected by removing bolts and nuts.

In addition, each cross frame preferably may further include a cutout flange formed with a cutout, and each end plate is inserted into the cutout.

For example, the cutout flange is arranged below the fastening flange, the end of each end plate is inserted into the cutout formed in this cutout flange, and the end plate is bolted in this state, thereby facilitating the positioning of the end plates.

In addition, when the battery cells stacked together with the pair of end plates are pressed using a press machine or the like, and the end plates are inserted into the cutouts in this state, the battery cells are likely to expand outward to release the load in the pressing direction; however, the end plates are locked in the cutouts, thereby suppressing this expansion.

Accordingly, the restricting dimension of the stacked battery cells is defined.

In the disclosure, each cross frame preferably may include a plate fastening part that fastens the end plate, and a case fastening part that is fastened to each side wall of the battery case at a position closer to an end of each cross frame relative to the plate fastening part.

With this configuration, since the external load is antecedently input into the cross frames and thereby readily protect the battery modules.

In addition, each cross frame may be fastened to each side wall of the battery case via the cross bracket, and two of the cross frames arranged back to back may be bolted with the cross bracket so that the two of the cross frames are able to be brought into contact together.

With this configuration, at the time of the external input, two cross frames arranged back to back abut against each other and thereby support each other from buckling.

In the disclosure, each cross frame may be fastened to each side wall of the battery case via the cross bracket, and each cross bracket, each end plate, and each cross frame may be fastened together by bolting.

With this configuration, when the cross frames are fastened to the battery case, the end plates are also fastened together by bolting; therefore, it is possible to reduce the number of components.

Advantageous Effects of Invention

The battery frame structure according to the disclosure is configured such that the cross frames as important components for protecting the battery modules are removably fastened to the inner side of the battery case, and the end plates is held to the cross frames to restrain the battery cells between the pair of end plates.

With this configuration, it is possible to reduce the number of components more than those of the related art and facilitate recycling of the cross frames when the cross frames are removed and reused as useful resources at the time of collecting batteries and the like.

Exemplary embodiments are described below. Note that the following exemplary embodiments do not in any way limit the scope of the content defined by the claims laid out herein. Note also that all of the elements described in the present embodiment should not necessarily be taken as essential elements An in-vehicle battery frame structure according to the disclosure will be described based on the drawings, hereinafter.

The disclosure includes: a battery case; cross frames removably fastened to side walls (left wall, right wall) included in the battery case; and a pair of end plates that is held to the pair of the cross frames and sandwiches the battery module including battery cells between the pair of end plates.

Note that the cross frames are removably fastened directly or indirectly to the side walls, and may be fastened indirectly thereto via cross brackets, for example.

In the present specification, for convenience of explanation, a direction likely to be subject to an external impact is expressed as a left-right direction; however, there is no limitation on the mounting direction to the vehicle, and there is no limitation on the number of battery modules fixed in the battery case.

The first embodiment is illustrated in FIGS. 1 to 7.

As illustrated in FIG. 1, the battery case 20 includes a frame body formed by using a left wall 21, a right wall 22, a front wall 23, and a rear wall 24, that are frames made of extruded aluminum material, and a panel body is attached to close an aperture on one side of this frame body.

There are no limitations on the material and the structure of the battery case; and as with the front wall 23 having a fixing part 23*a* to the vehicle at its lower part, for example, the rear wall 24 may also have a fixing part to the vehicle, if necessary.

Further, the left and right walls 21, 22 may have a structure having outer hollow parts 21*a*, 22*a* outwardly protruding so as to easily absorb an external impact.

Cross brackets 25 are disposed with predetermined intervals on the inner sides of the left and right walls 21, 22.

Figure 6:
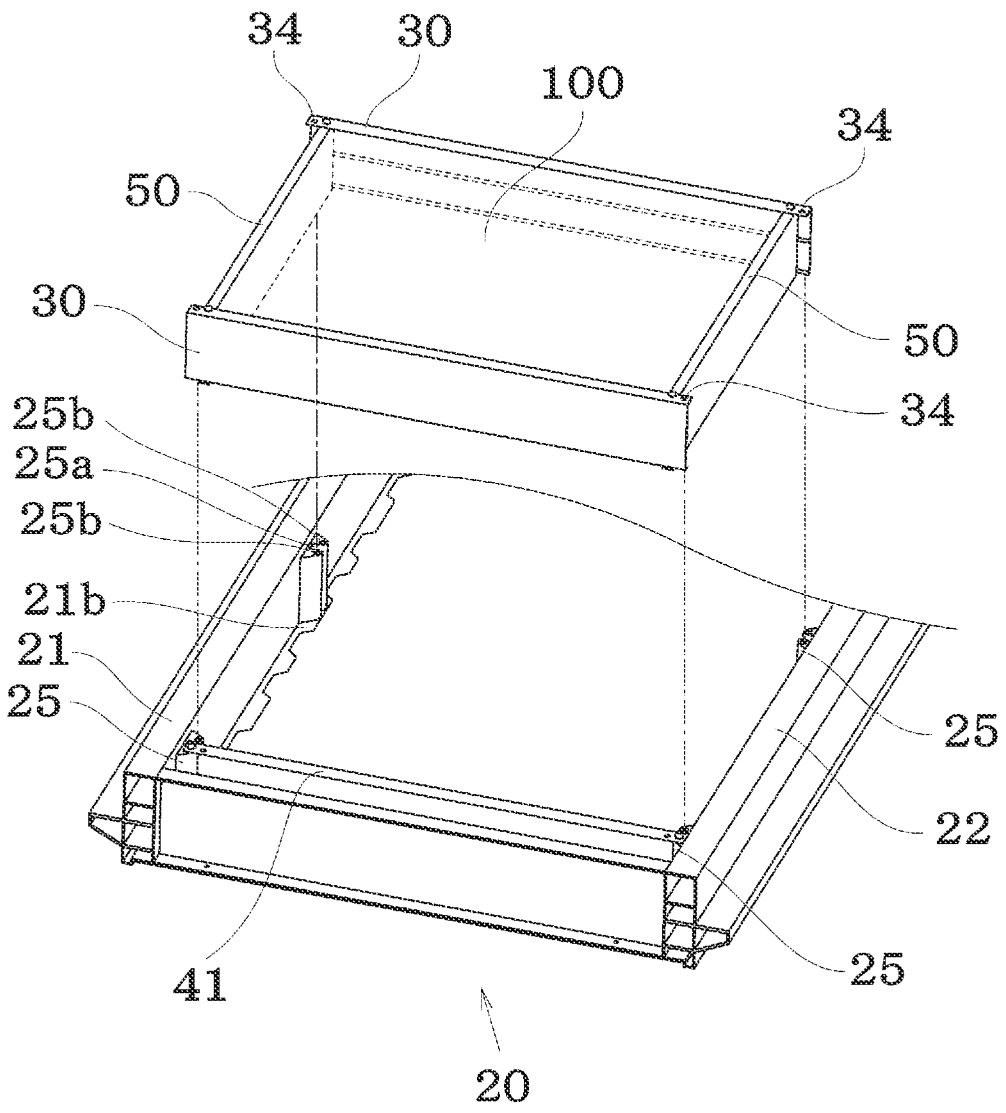
FIG. 6 illustrates an example of a state in which the battery module is installed into the battery case.

Each cross bracket 25 of the present embodiment is formed in a substantially triangular shape, as illustrated in FIG. 6, and includes: an insertion part 25*a* into which two cross frames 30, 30 can be inserted; and fastened holes 25*b*, 25*b* located on substantially both front and rear sides of this insertion part 25*a* and extending through the insertion part 25*a* in the up-down direction.

In the present embodiment, it is exemplified that the left wall 21 has ribs 21*b* extending from the bottom side toward the inner side, and when the cross brackets 25 are arranged on the ribs 21*b* and then they are bolted to each other, the cross frames 30 described later are also bolted together; however, the cross brackets 25 may be fixed in advance to the inner side of the left wall 21 by welding or the like, and the cross brackets 25 may be similarly arranged to the inner side of the right wall 22.

Each cross frame 30 includes: a body part 31 made of aluminum extending in the left-right direction; and flanges 32, 35, 38 protruding from a front surface 31*a* of this body part, and a rear surface 31*b* can abut against a rear surface 31*b* of the other cross frame 30.

In the present embodiment, it is exemplified to include a fastening flange 32 greatly protruding from the upper part of the front surface 31*a*, and cutout flanges 35, 38 slightly protruding below this fastening flange 32.

In the present specification, a flange for fastening the end plate is referred to as a fastening flange, and a flange into which the end plate can be inserted is referred to as a cutout flange; and there is no limitation on the numbers of these flanges.

On both end sides, the fastening flange 32 includes: plate fastening parts 33, 33 that are fastened to an end plate 50; and case fastening parts 34, 34 that are fastened to the cross bracket 25 at a position closer to an end of cross frame 30 relative to the plate fastening parts 33, 33.

The cutout flanges 35, 38 are formed respectively with substantially U-shaped cutouts 36, 39 below the plate fastening parts 33, and the outer parts than the cutouts 36, 39 serve as outer flanges 37, 40.

In the meantime, each end plate 50 is a substantially rectangular parallelepiped made of extruded aluminum material, and has fastened parts 51, 51 in the upper parts on both end sides of the end plate.

In the present embodiment, it is exemplified that battery cells 10 are stacked in the right-left direction between the pair of end plates 50, 50; however, the shape of the battery cells, the number of layers of the battery cells, and the direction of stacking the battery cells are not limited; and intermediate plates that can be fastened to the cross frames or the like may be arranged between the battery cells.

Further, the shape of each cutout is not particularly limited as long as the object of the disclosure can be achieved.

Description will be specifically provided on how to fix the battery module 100 into the battery case 20.

Figure 2:
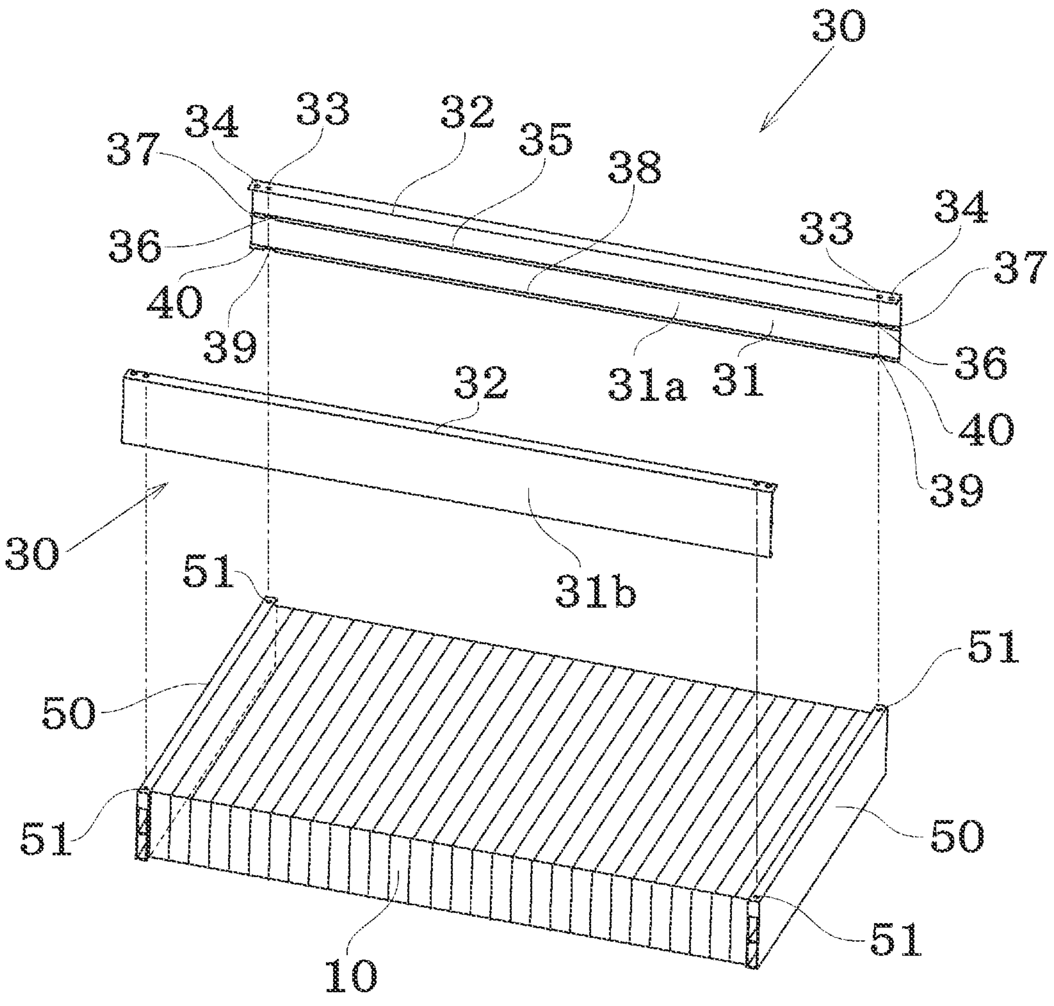
FIG. 2 illustrates an example of the structure of battery cells stacked between a pair of cross frames and a pair of end plates.
Figure 4:
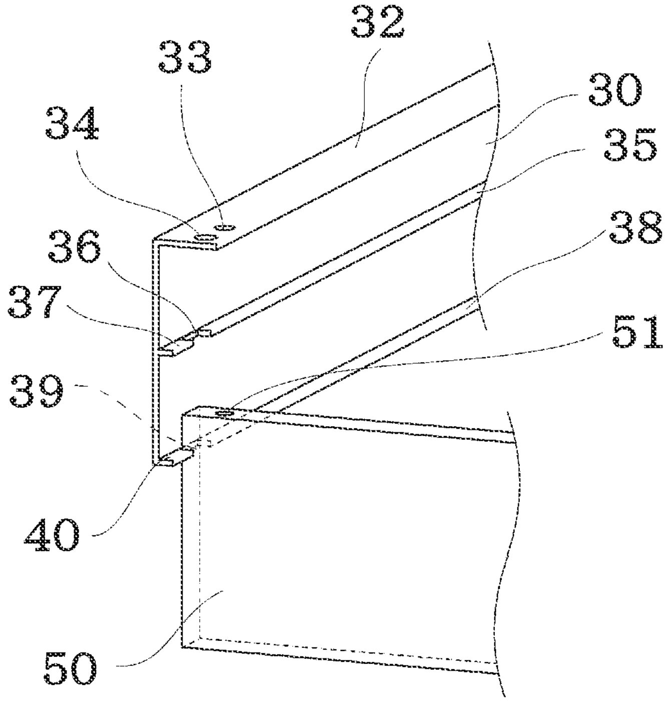
FIG. 4 is a partially enlarged view illustrating an example of a state in which the end plate is inserted into the cross frame.

As illustrated in FIG. 2, the pair of end plates 50, 50 and the battery cells 10 are pressed in the left-right direction using a press machine or the like; and in this state, as illustrated in FIG. 4, that is a partially enlarged view, the end side of each end plate 50 is inserted into the cutouts 36, 39 of each cross frame 30 from below.

Figure 5:
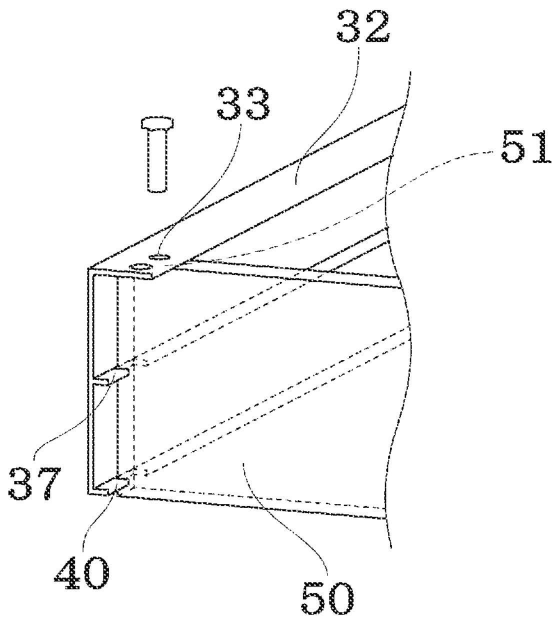
FIG. 5 is a partially enlarged view illustrating an example of a state in which the end plate is fastened to the cross frame.

Since the battery cells 10 is likely to expand outward to release the load in the pressing direction, the end plate 50 inserted into the cutouts 36, 39 abut against and is locked to the outer flanges 37, 40 in the cutouts 36, 39, as illustrated in FIG. 5.

Figure 3:
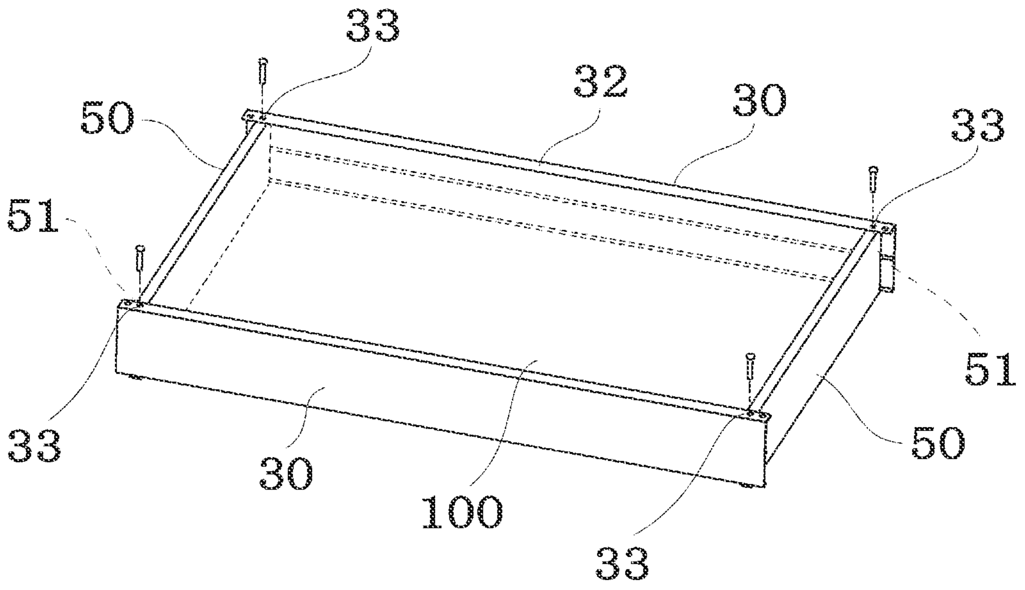
FIG. 3 illustrates an example of a state in which the end plates are fastened to the cross frames.

At this time, by bolting the plate fastening parts 33 of the fastening flanges 32 and the fastened parts 51 of the end plates 50 located under and overlapping the fastening flanges, as illustrated in FIG. 3, it becomes easier for the pair of cross frames 30, 30 to maintain the restraining state of the battery module 100 between the pair of end plates 50, 50.

Figure 7:
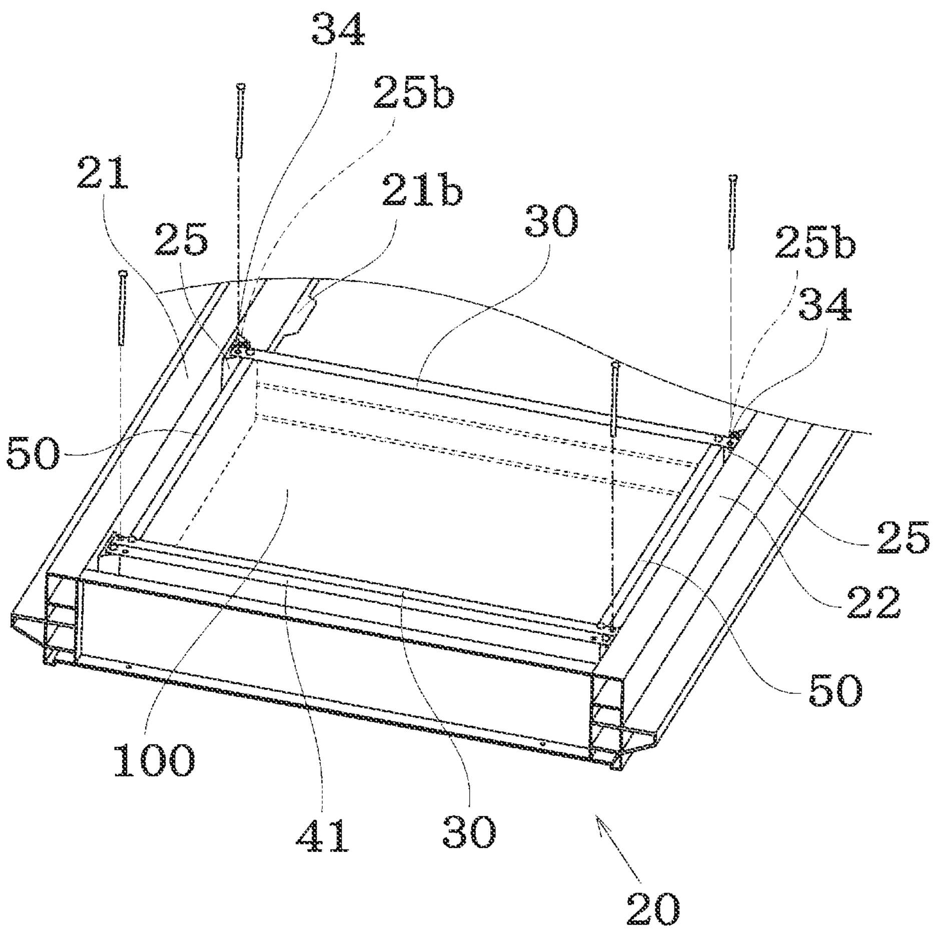
FIG. 7 illustrates an example of a state in which the battery module is fixed into the battery case.
Figure 8:
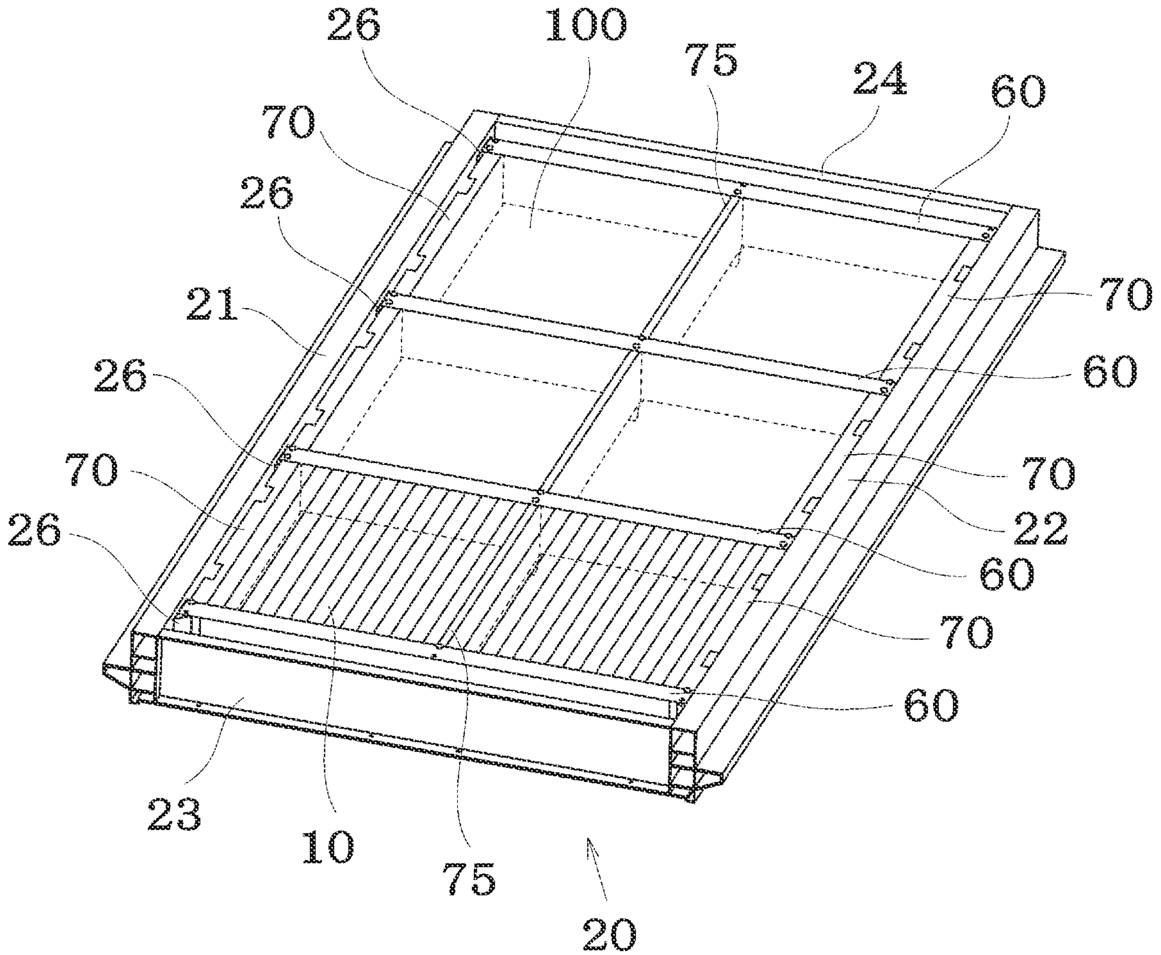
FIG. 8 illustrates an example of an in-vehicle battery frame structure of the second embodiment.

Next, as illustrated in FIG. 6, both ends of the cross frames 30 restraining the battery module 100 are inserted into insertion parts 25*a* of the cross brackets 25 from above, and as illustrated in FIG. 7, the side wall (the left wall 21 or the right wall 22), the cross bracket 25, and the cross frame 30 are bolted.

Specifically, for example, a rib 21*b* of the left wall 21 illustrated in FIG. 6, a fastened hole 25*b* of each cross bracket 25 arranged on this rib 21*b*, and a case fastening part 34 of each fastening flange 32 stacked on this fastened hole 25*b* are bolted together.

Accordingly, it is possible to fix the battery module 100 into the battery case 20.

In the present embodiment, two cross frames 30, 30 arranged back to back that restrain respective different battery modules can be inserted into the insertion part 25*a* of one cross bracket 25 such that the rear surfaces 31*b* of the respective body parts 31 can abut against each other.

By repetitively fixing the battery modules, battery modules 100 can be installed in the battery case 20, as illustrated in FIG. 1.

A cross frame 41 that restrains no battery module is inserted and fastened to each of the cross brackets 25 located at the front and rear ends of the battery case 20; and alternatively, instead of the cross frame 41, the front and rear walls 23, 24 or the like may be insertable and fastenable to the cross bracket 25.

In the above battery frame structure, two cross frames arranged back to back that restrain respective different adjacent battery modules abut against each other to support each other from buckling when an external input is applied, and transmit the load to the end plates fastened to the cross frames; therefore, the battery modules can be easily protected from the external load.

Further, at the time of collecting the battery modules, it is possible to collect the battery modules one by one from the battery case.

An example of the battery frame structure of the second embodiment is illustrated in FIGS. 8 to 11.

Figure 9:
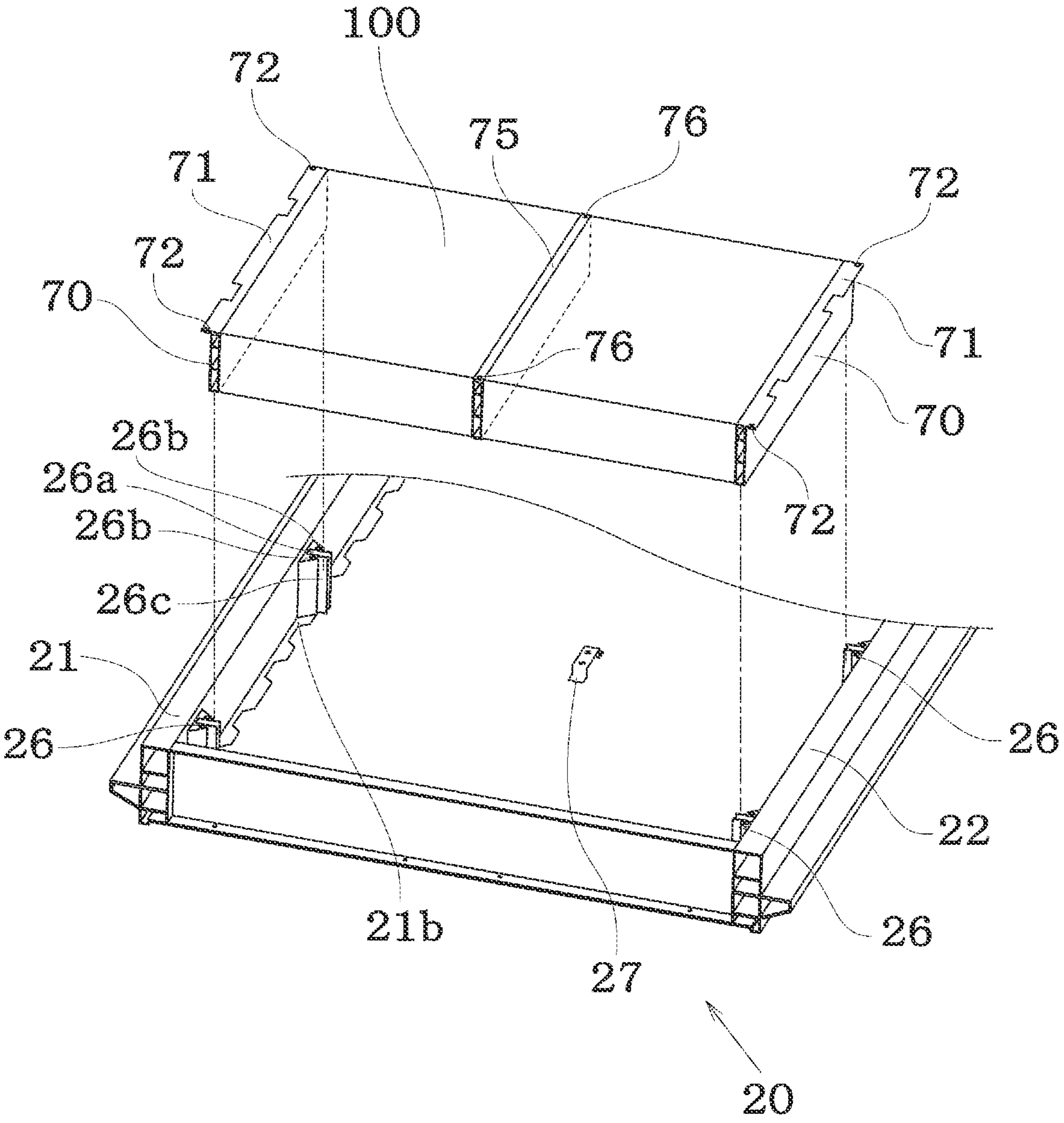
FIG. 9 illustrates an example of a state in which battery cells stacked between the pair of cross frames is installed in the battery case.

As illustrated in FIG. 9, each cross bracket 26 of the present embodiment has a substantially triangular shape and includes an insertion part 26*a* into which one cross frame 60 is insertable, and two fastened holes 26*b*, 26*b* extending through the cross bracket in the up-down direction substantially on both front and rear sides of the insertion part 26*a*; and the cross bracket 26 further includes two locked parts 26*c*, 26*c* that are substantially right-angled shape and located on both front and rear outer sides of the insertion part 26*a*, and the locked parts 26*c*, 26*c* can lock respective end plates 70.

The shape of each locked part 26*c* is not limited as long as the locked part can lock the end plate 70 in the left-right direction and in the front-rear direction.

In the present embodiment, it is exemplified that the cross brackets 26 are fixed in advance to the inner sides of the left and right walls 21, 22 by welding or the like; however, as in the first embodiment, the cross brackets may be arranged on the ribs of the left and right walls, and the cross brackets and the ribs may be bolted together.

As illustrated in FIG. 9, each end plate 70 is made of extruded aluminum material and includes a flange part 71 on the upper part thereof, and fastened parts 72, 72 are formed at the front and rear end sides of this flange part.

In the present embodiment, it is exemplified that one intermediate plate 75 is also stacked together when the battery cells 10 are stacked in the right-left direction between the pair of end plates 70, 70; however, there are no limitations on the number and the stacking position of the intermediate plates, and no intermediate plate may be provided.

The intermediate plate 75 is a substantially rectangular parallelepiped made of extruded aluminum material, and has fastened parts 76, 76 in the upper parts on both end sides of the intermediate plate.

Figure 10:
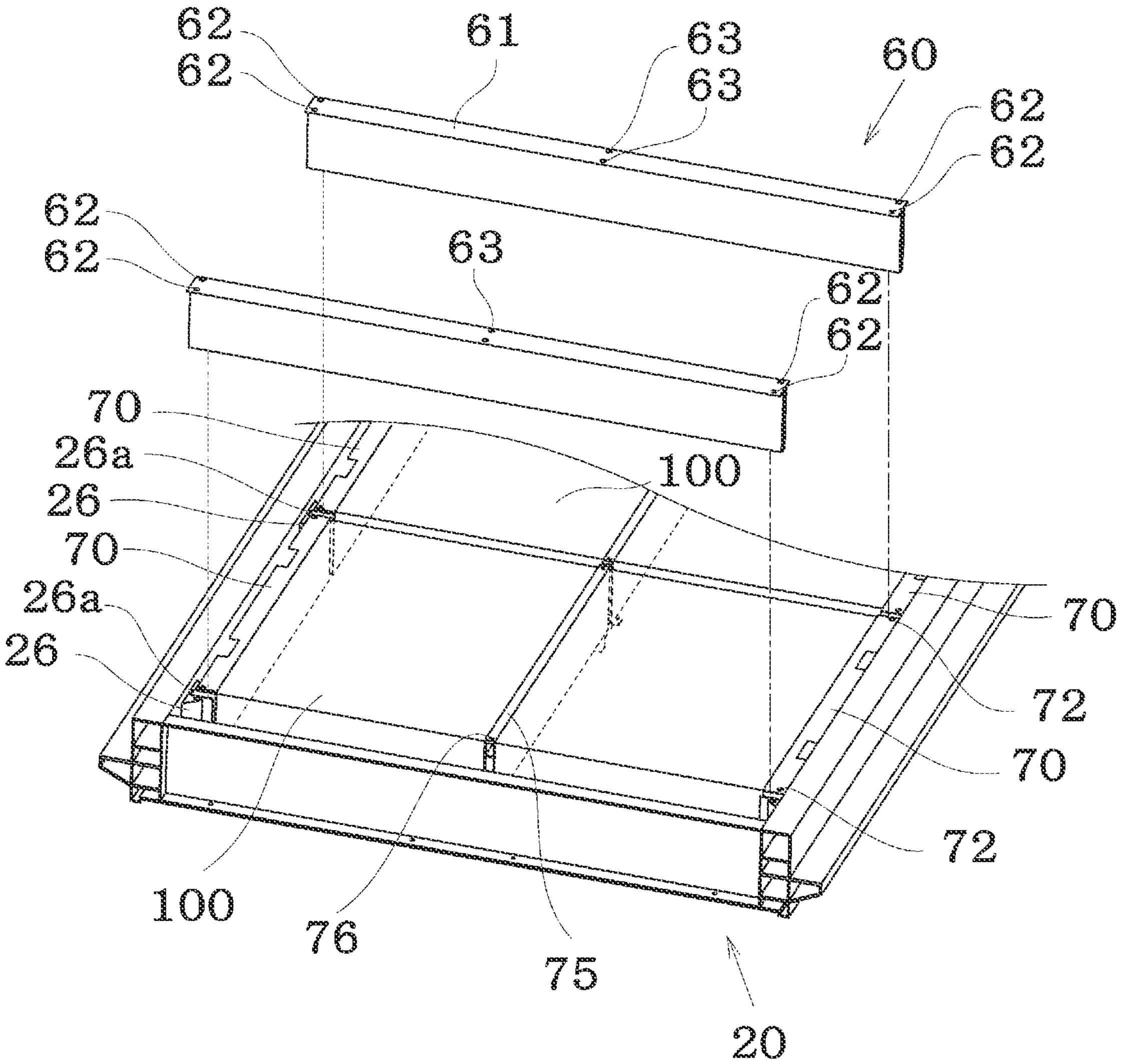
FIG. 10 illustrates an example of a state in which further cross frames are inserted.

In the meantime, as illustrated in FIG. 10, each cross frame 60 is made of extruded aluminum material, has a long body extending in the left-right direction, and has a fastening flange 61 protruding frontward and rearward in the upper part of the cross frame.

The fastening flange 61 includes: joint fastening parts 62 that fasten the end plate 70 and the cross bracket 26 on both end sides of the fastening flange 61; and intermediate fastening parts 63 corresponding to the fastened parts 76 of the intermediate plate 75.

How the battery module 100 in the present embodiment is fixed will be described.

As illustrated in FIG. 9, battery cells 10 and intermediate plates 75 are pressed together with the pair of end plates 70, 70 in the left-right direction using a press machine or the like.

Each end plate 70 in the above pressed state is inserted from above between two cross brackets 26, 26 fixed in advance respectively to the left and right walls 21, 22.

Since the battery cells 10 is likely to expand outward to release the load in the pressing direction, the end side of each end plate 70 is locked to the locked parts 26*c* on one side of the cross brackets 26.

At this time, the fastened part 72 of each end plate 70 (the flange part 71) overlaps the fastened holes 26*b* of the cross brackets 26.

Similarly, FIG. 10 illustrates a state in which the end plate 70 for another battery module 100 is locked to the locked parts 26*c* on the other side of the cross brackets 26.

Figure 11:
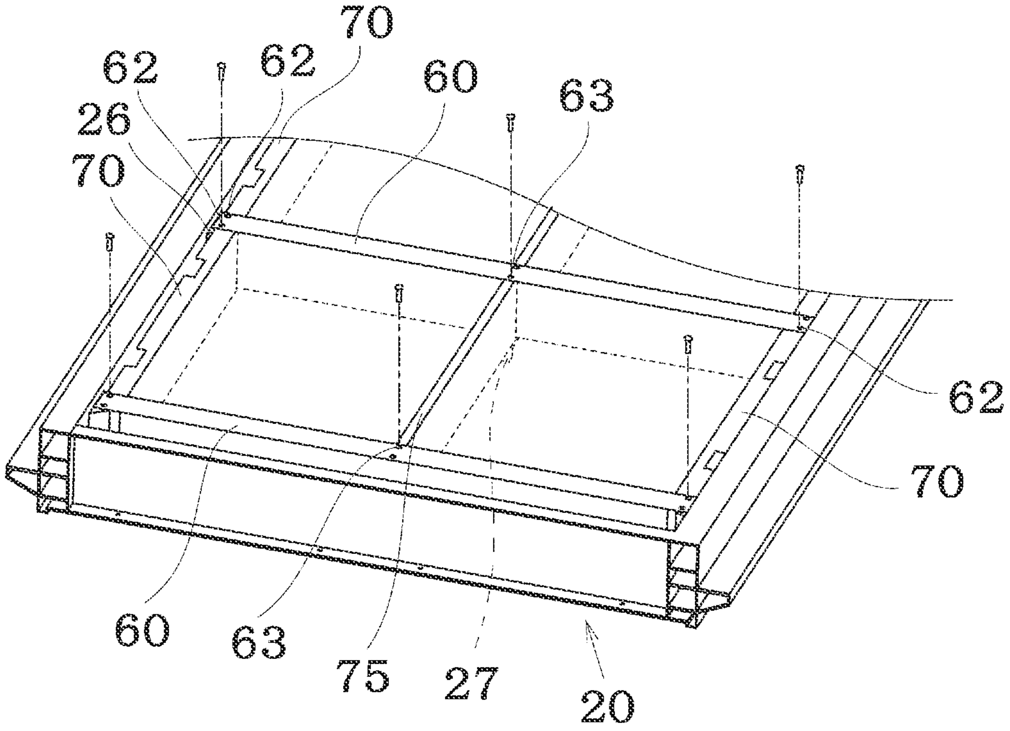
FIG. 11 illustrates an example of a state in which the battery modules are fixed into the battery case.

In this state, each cross frame 60 is inserted into the insertion parts 26*a* of each cross bracket 26 from above, and the cross bracket 26, the end plate 70, and the cross frame 60 are fastened together as illustrated in FIG. 11.

Specifically, the fastened holes 26*b* of each cross bracket 26 arranged on each rib 21*b*, the fastened part 72 of each end plate 70 (the flange part 71) stacked on the fastened holes 26*b*, and the joint fastening parts 62 of the cross frame 60 (the fastening flange 61) stacked on this fastened part 72 are bolted together.

Accordingly, the battery module 100 can be fixed into the battery case 20.

As illustrated in FIG. 9, each intermediate plate 75 is disposed on a bottom bracket 27 fixed on the panel body of the battery case 20, and the bottom bracket 27 and the cross frame 60 can be bolted together, as illustrated in FIG. 11.

The battery frame structure thus configured can reduce more bolts to be fastened, that facilitates collection of the batteries during recycling.

Furthermore, according to the disclosure, the battery module can be also restrained in the up-down direction using the fastening flanges of the cross frames.

The battery frame structure according to the disclosure has a high protective effect when battery modules are mounted to a vehicle and is excellent in promotion of recycling as well.

Although only some embodiments of the present disclosure have been described in detail above, those skilled in the art will readily appreciate that many modifications are possible in the embodiments without materially departing from the novel teachings and advantages of this disclosure. Accordingly, all such modifications are intended to be included within scope of this disclosure.

The invention claimed is:

1. An in-vehicle battery frame structure for mounting a battery module having battery cells to a vehicle, the in-vehicle battery frame structure comprising:
- a battery case having side walls;
- cross frames removably fastened between the side walls; and
- a pair of end plates fastened to a pair of opposing cross frames among the cross frames,
- wherein the battery cells, which are arranged within a rectangular frame formed by the pair of cross frames and the pair of end plates, are pressed and sandwiched between the pair of end plates, and the rectangular frame with the battery cells is positioned between the side walls such that the pair of end plates are parallel to the side walls, with the pair of cross frames removably fastened to the side walls.

2. The in-vehicle battery frame structure according to claim 1, wherein
- each cross frame includes a fastening flange that fastens each end plate to each cross frame by bolting.

3. The in-vehicle battery frame structure according to claim 2, wherein
- each cross frame further includes a cutout flange formed with a cutout, and each end plate is inserted into the cutout so that the battery cells are pressed and sandwiched between the pair of end plates.

4. An in-vehicle battery frame structure for mounting a battery module to a vehicle, the in-vehicle battery frame structure comprising:
- a battery case;
- cross frames removably fastened to side walls included in the battery case; and
- a pair of end plates held to a pair of the cross frames and that sandwich battery cells between the pair of end plates,
- wherein each cross frame includes a plate fastening part that fastens the end plate to each cross frame and a case fastening part that fastens each side wall of the battery case to each cross frame at a position closer to an end of each cross frame relative to the plate fastening part.

5. The in-vehicle battery frame structure according to claim 2, wherein
- each cross frame includes a plate fastening part that fastens the end plate to each cross frame and a case fastening part that fastens each side wall of the battery case to each cross frame at a position closer to an end of each cross frame relative to the plate fastening part.

6. The in-vehicle battery frame structure according to claim 3, wherein
- each cross frame includes a plate fastening part that fastens the end plate to each cross frame and a case fastening part that fastens each side wall of the battery case to each cross frame at a position closer to an end of each cross frame relative to the plate fastening part.

7. An in-vehicle battery frame structure for mounting a battery module to a vehicle, the in-vehicle battery frame structure comprising:
- a battery case;
- cross frames removably fastened to side walls included in the battery case; and
- a pair of end plates held to a pair of the cross frames and that sandwich battery cells between the pair of end plates,
- wherein each side wall of the battery case includes a cross bracket,
- each cross frame is fastened to each side wall of the battery case via the cross bracket, and
- two of the cross frames arranged back to back are bolted to the cross bracket so that the two of the cross frames are able to be brought into contact together.

8. The in-vehicle battery frame structure according to claim 2, wherein
- each side wall of the battery case includes a cross bracket,
- each cross frame is fastened to each side wall of the battery case via the cross bracket, and
- two of the cross frames arranged back to back are bolted to the one cross bracket so that the two of the cross frames are able to be brought into contact together.

9. The in-vehicle battery frame structure according to claim 3, wherein
- each side wall of the battery case includes a cross bracket,
- each cross frame is fastened to each side wall of the battery case via the cross bracket, and
- two of the cross frames arranged back to back are bolted to the one cross bracket so that the two of the cross frames are able to be brought into contact together.

10. The in-vehicle battery frame structure according to claim 4, wherein each side wall of the battery case includes a cross bracket, each cross frame is fastened to each side wall of the battery case via the cross bracket, and two of the cross frames arranged back to back are bolted to the one cross bracket so that the two of the cross frames are able to be brought into contact together.

11. An in-vehicle battery frame structure for mounting a battery module to a vehicle, the in-vehicle battery frame structure comprising:

a battery case;

cross frames removably fastened to side walls included in the battery case; and a pair of end plates held to a pair of the cross frames and that sandwich battery cells between the pair of end plates, wherein each side wall of the battery case includes a cross bracket, each cross frame is fastened to each side wall of the battery case via the cross bracket, and each cross bracket, each end plate, and each cross frame are fastened together by bolting.

* * * * *